United States Patent [19]

Adachi et al.

[11] Patent Number: 4,655,579
[45] Date of Patent: Apr. 7, 1987

[54] MULTICOLORED IMAGE FORMING APPARATUS

[75] Inventors: Tsukasa Adachi, Hoya; Satoshi Shinguryo, Kawaguchi; Hideya Furuta, Yokohama; Yoshihiro Sakai, Tokyo; Itsuo Ikeda, Sagamihara; Katsuo Sakai, Yokohama, all of Japan

[73] Assignee: Ricoh Company, Ltd., Tokyo, Japan

[21] Appl. No.: 768,955

[22] Filed: Aug. 23, 1985

[30] Foreign Application Priority Data

Aug. 30, 1984 [JP]  Japan ............................ 59-130627[U]
Aug. 30, 1984 [JP]  Japan ............................ 59-130628[U]
Aug. 31, 1984 [JP]  Japan ................................ 59-180383

[51] Int. Cl.[4] ........................................... G03G 15/00
[52] U.S. Cl. ...................................... 355/4; 355/3 R; 355/8; 355/14 R
[58] Field of Search .................. 355/4, 3 R, 8, 3 CH, 355/1, 14 R

[56] References Cited

U.S. PATENT DOCUMENTS 3,834,807  9/1974  Fuller et al. ........................ 355/3 R
4,255,042  3/1981  Armitage, Jr. et al. ............ 355/3 R
4,334,763  6/1982  Honda et al. ............................ 355/8
4,375,647  3/1983  Mir ....................................... 355/4 X
4,435,064  3/1964  Tsukada et al. ................. 355/3 R X

Primary Examiner—A. C. Prescott
Attorney, Agent, or Firm—Cooper, Dunham, Griffin & Moran

[57] ABSTRACT

Multicolored image forming apparatus wherein image processing is accomplished by exposing a photosensitive drum through an exposure optical device to the reflected light beam from the document illuminated with a lamp, reading the document image by an image sensor, energizing, by means of the processed signal of the output of the sensor, each LED in an eraser consisting of an LED array offset from the exposure slit center along the photosensitive drum in the width direction thereof, and erasing it.

The light source simultaneously illuminates the document illumination position for slit exposure and a position offset from its center by a distance equal to the displacement between said erase position and the exposure position. The image sensor receives the light beam reflected from the document.

24 Claims, 7 Drawing Figures

MULTICOLORED IMAGE FORMING APPARATUS

FIELD OF THE INVENTION AND RELATED ART STATEMENT

This invention relates to a multicolored image forming apparatus.

With the known multicolored image forming apparatus according to the prior art, an original document is scanned by the light three times in an exposing process, and each time a respective filter of one of the three primary colors (blue, green and red) is inserted into the light path to cause color separation of the reflected rays on the original. The three kinds of color separated lights are applied in turn on a photosensitive member to make electrostatic latent images which are developed with yellow, magenta and cyan (the three primary colors for the subtractive color reproduction method to form three color tone images that are then transferred to copy paper, one image on top of another, to obtain a full color copy.

In theory, it should be possible to reproduce every color, including black, through appropriate mixing of the three colors (yellow, magenta and cyan), while, in practice, it is not always possible to reproduce the color tone, gradation and sharpness of originals, because the spectral transmission characteristics of color separation filters and the spectral reflection characteristics of color toners are far from ideal. From time to time, intentional alterations of color tones from the original may be desirable. In addition, since most business documents are printed only in black or almost in black, the prior art, in which three toner images, obtained by the three separate exposures and three developments, are transferred by superimposing one on top of another, has suffered drawbacks that not only a desirable black cannot be expected, but also with fine characters color shift becomes apparent, and a great loss of light quantity and time takes place.

Figure 1:
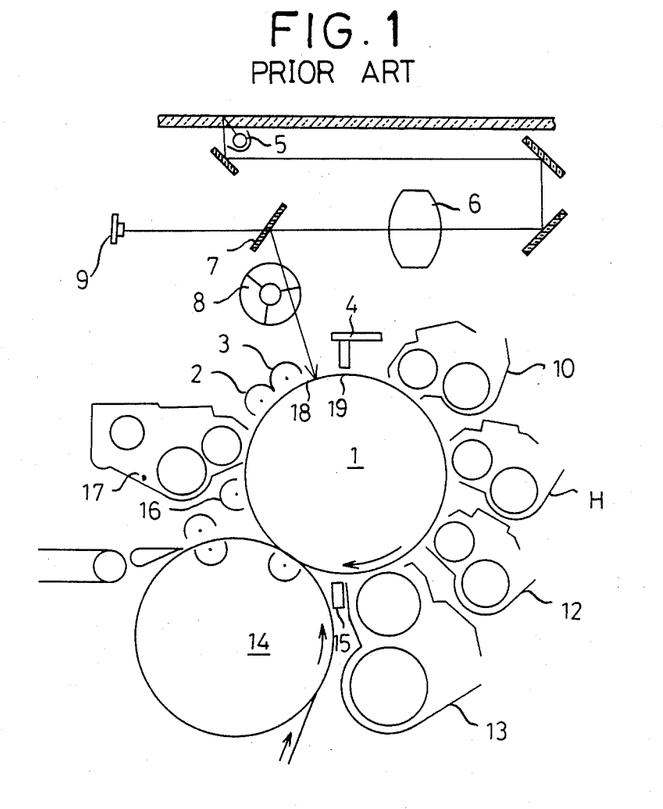
FIG. 1 is a sectional view of a multicolored image forming apparatus according to the prior art.

Another prior art of multicolored image forming apparatus has been proposed as shown in FIG. 1 to cope with said drawbacks, in which the light beam originating from a light source 5, and reflecting from the surface of an original document proceeds through a lens 6 and color separation filters 8 before reaching an exposure location 18 on a photosensitive drum 1, and which comprises color developing devices 10, 11 and 12 of yellow, magenta and cyan located successively downstream with respect to the rotational direction of the exposure location 18, another color developing device 13 located next to the color developing device 12 and having a black toner, a half reflective mirror 7 between the lens 6 and the the filter 8 splitting slit exposure light, a color image sensor 9 (at the image-forming point of the mirror transmission light) extending in the axial direction of the photosensitive drum 1, and an eraser 4 (between the exposure location 18 on the photosensitive drum 1 and the yellow developing device 10) including a light emitting diode (LED) array extending also in the axial direction of the photosensitive drum 1. In said color image sensor 9, the filter arrays, in which the sets of three filters of blue, green and red are alternatively placed in front of the photo-receptors on the charge coupled device (CCD), are respectively disposed correspondingly to each photoreceptor. The three primary color components of light beams emitted from image elements corresponding to a set of filters of blue, green and red can be detected as outputs of the three photo-receptors. One element of LED is provided in the eraser 4 correspondingly to each set of filters of the color image sensor 9. The color detected as the output from one set of photo-receptors in the color image sensor 9, after being processed by a mathematical processing circuit, is used to turn on and off LED elements in the eraser 4 in the course of light exposures when the light beams respectively pass through four-color filters of blue, green, red and colorless. Finally, to gain a total image with desired color tone, gradation and sharpness, the four toner images obtained by developing said processed colors for yellow, magenta, cyan and black with the developing devices are transferred one on top of another onto copy paper wound on the transfer drum 14. For example, the area of the image determined to be black by the color image sensor 9 is not developed in the process of developing yellow, magenta, and cyan because the removal of electricity (i.e. the latent image) by the eraser 4 does not allow the color toners to work. On the other hand, the process of developing the part of the image determined to be black where the remaining area is discharged by the eraser 4, permits only the black area of image to be developed by the black toner, so that a pure, sharp black image, without any color displacement, can be obtained. In addition, this system permits a preset processing program to perform various color corrections.

In FIG. 1, Numeral 2 is an electric discharger, Numeral 3 an electric charger, and Numeral 15 and 16 are respectively pre-transfer and pre-cleaning electric dischargers. Numeral 17 denotes a cleaning unit.

With an apparatus having a configuration according to the prior art as shown in FIG. 1, the incident light beam into the color image sensor 9 is along the optical axis and is obtained by splitting the slit beam for exposure by means of the half reflecting mirror 7. Since the output of the color image sensor 9 is instantaneously processed, the processed output is input into the eraser 4 to turn on and off the LED in the eraser 4 and to erase the photosensitive member at the point 19 in FIG. 1, which results in erasing the position ahead of the exposure point 18 by the distance between areas 18 to 19 by means of the light beam coming from the same point on the original document. To get rid of this drawback, a delay circuit with memory is required between the output terminal of the processing circuit for the output from the color image sensor 9 and the eraser 4, so as to give a time lag to the input into the eraser 4 by the length of time needed for the photosensitive drum 1 to move from the exposure point 18 to the erasing location 19. Such a circuit with memory is expensive, and involves an additional cost of the apparatus.

OBJECT AND SUMMARY OF THE INVENTION

The object and purpose of the invention is to provide a multicolored image forming apparatus capable of processing an image by reading an original document with a color image sensor and processing the output to provide an input into the eraser, without the expensive memory circuit required to eliminate the abovementioned drawbacks of the prior art.

To achieve the aforementioned object, in a multicolored image forming apparatus according to the invention, a light source is provided to simultaneously illuminate a point for exposure on an original document and another point on the document offset in the scanning direction from the center of a slit-shape image to be exposed by a distance corresponding to a displacement of the erasing position of the photosensitive member by said eraser from the slit center of the slit exposure point, and an image sensor is provided to receive the reflected light beam from said position offset from the illumination point on the original document.

BRIEF DESCRIPTION OF THE DRAWING

In the accompanying drawings, there are shown illustrative embodiments of the invention from which these and other of its objectives, novel features and advantages will be readily apparent.

In the drawings.

DETAILED DESCRIPTION OF THE PREFERRED EMBODIMENTS

A detailed description of embodiments according to the invention is presented below referring to the drawings.

Figure 2:
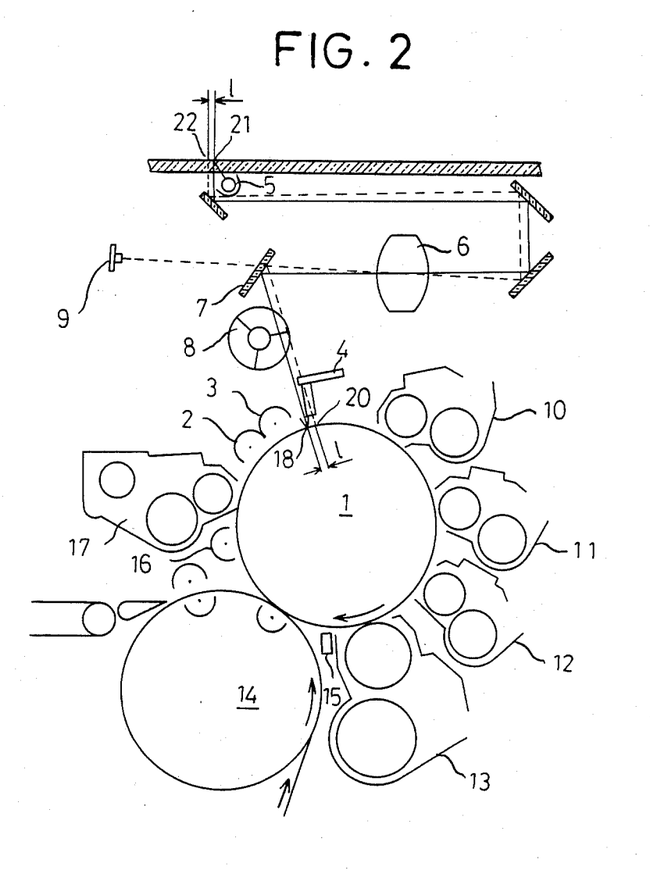
FIGS. 2, 3 and 4 are sectional views of various embodiments according to the invention.

FIG. 2 is an embodiment according to the invention applied to apparatus of the type discussed in connection with the prior art shown in FIG. 1. The same numerals denote the components performing the same function.

In the embodiment of FIG. 2, an eraser 4 is disposed to illuminate a point 20 ahead of an exposure slit center 18 by a distance l in the direction of the rotation of a photosensitive drum 1 within the region exposed with the exposure optical system, when an image is produced on the photosensitive drum 1. The light beam which forms an image at the position 20 comes from another point 22 on the original document, which is offset from an illumination slit center 21 in the direction of scanning, and the optical axis of the beam travels along the broken line in FIG. 2 to reach the photosensitive drum 1. However, a large part of the light beam is shielded by the eraser 4. A color image sensor 9 is so arranged that the transmitted light beam, which has been split by a half reflecting mirror 7, proceeding along aforesaid broken line as an optical axis produces the image at the incidence position of the color image sensor 9.

When an equal-size image-formation system is employed in the exposure optical system, the distance l measuring along the surface of the photosensitive drum 1 between the center of the image exposure slit 18 and the eraser illumination point 20 comes to be equal to the distance between the illumination center 21 on the original and the point 22 from which the light beam is reflected to reach the eraser illumination point 20, and both offset directions from the slit centers are the same with respect to the scanning direction. Therefore, when the output of the color image sensor 9 resulting from reading an image at the point 22 on the original is processed to actuate the eraser 4 immediately, erasing is performed to process the image transmitted from the point 22 on the original. At this time, the image at the illumination center 21 on the original is exposed at the exposure slit center 18, just as the image at the point 22 on the original was exposed at the point 20 on the photosensitive member through the exposure slit center 18 at an earlier time, which occurred early enough to allow the point 18 to come to the point 20. This way, a proper image processing can be achieved.

Therefore, the abovementioned processing eliminates the need for memory and a delay circuit between the output processing circuit in the color image sensor 9 and the eraser 4.

Figure 3:
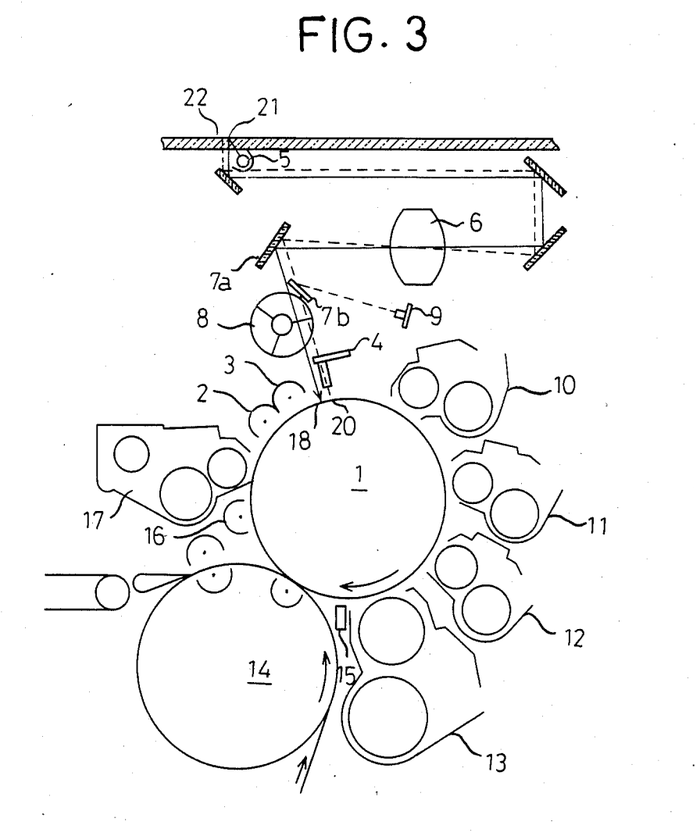

The method of separating the light beam reaching the illumination point 20 of the eraser 4 from the exposure light path is not limited to the half reflecting mirror located as in said embodiment in FIG. 2. As shown in FIG. 3, the half reflecting mirror in FIG. 2 can be replaced with a mirror 7a, another half-reflecting mirror 7b introduced between the mirror 7a and a filter 8, and the color image sensor 9 disposed at the image-forming position of the reflected light beam shown by a broken line. In other respects, the configuration in FIG. 3 is the same as the one in FIG. 2. Since the operation of the embodiment in FIG. 3 is also the same as the one in FIG. 2, any further explanation is omitted.

Figure 4:
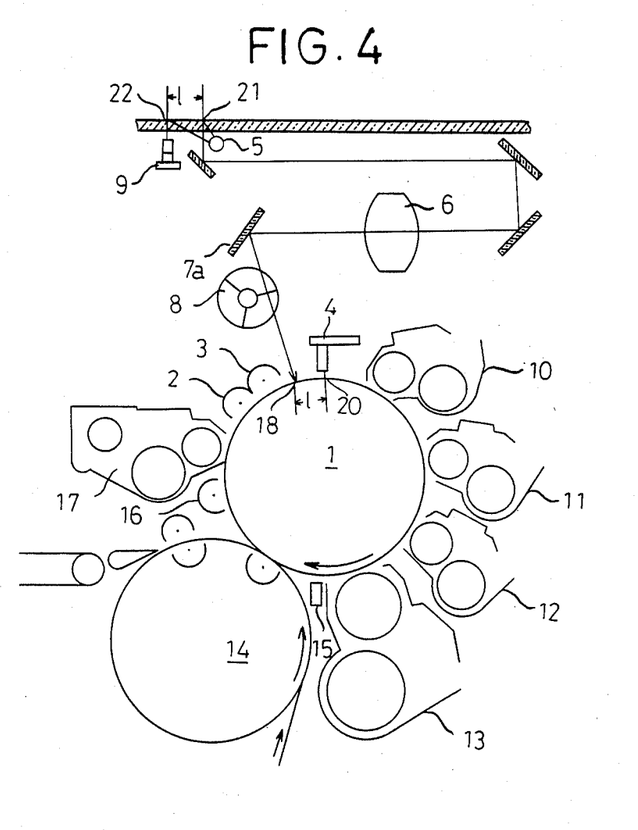

Now, another embodiment according to the invention shown in FIG. 4 is explained.

In this embodiment, an original document is irradiated by a light source 5 at a point 22 a distance l apart from a document illumination slit center 21 (irradiated by the light source 5 for image illumination) in the direction opposite to the scanning direction (i.e., on the side already illuminated) to reflect the beam from the light source 5. A color image sensor 9 including an image-forming lens is disposed to directly receive said reflected beam without passing it through an exposure optical system. An eraser 4 is so arranged that its illumination point 20 falls onto a point which is the same distance l from an image exposure slit center 18 on a photosensitive drum 1 in the rotating direction of the photosensitive drum 1 (i.e., in the anti-scanning direction). The half reflecting mirror 7 (disposed in the exposure beam path for splitting light beams) in the apparatus according to the prior art shown in FIG. 1 is replaced with a mirror 7a in FIG. 4. As one can see, the apparatus shown in FIG. 4 does not include any memory nor delay circuit between the output processing circuit of the color image sensor 9 and the eraser 4. In other respects, the configuration in FIG. 4 is the same as in FIG. 1.

When this exposure optical system is employed in an equal-size image-formation optical system, the document scanning speed equals the circumferential speed of the photosensitive drum 1. Therefore, the time during which the illumination slit center 21 on the original moves by a distance l to reach the reading point 22 of the color image sensor 9 is equal to the time required for the exposure slit center 18 on the photosensitive drum 1 to reach the eraser illumination point 20. Therefore, the portion which is at position 20 on the photosensitive drum 1 while a position 18 on the drum 1 is receiving the image from position 21 on the original, has received the image at position 22 on the document. Therefore, a desired image processing can be achieved.

The image reading point 22 of the color image sensor 9 may be located ahead of the the document illumination center 21 (for exposure) in the scanning direction (on the side to be exposed in a short future for exposure), if the exposure position 20 of the eraser 4 is located ahead of the exposure slit center 18 in the scanning direction (behind the center 18 in the rotational direction of the photosensitive drum 1).

Figure 5:
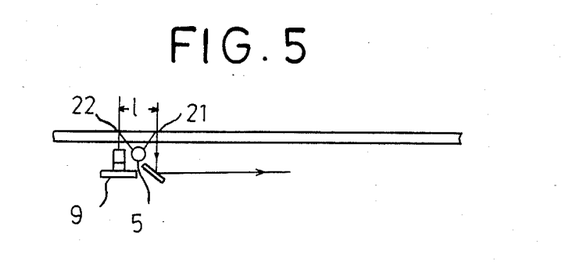
FIG. 5 is a detailed sectional view showing vital parts of a modified embodiment of the invention illustrated in FIG. 4.

As shown in FIG. 5, the light source 5 can be located between the document illumination center 21 for exposure and the document illumination point 22 for reading by the color image sensor 9, which shortens the incident distance of the light beam from the light source 5 to the point 22 on the document, thus resulting in a smaller incidence angle, to help reduce the loss of incident light onto the color image sensor 9.

In the apparatus according to the embodiment of FIG. 5, the incident light beam to the color image sensor 9 does not utilize only a part of the light beam passing through the exposure optical system, thus eliminating the need for the half reflecting mirror and making full use of the light beams passing through the exposure optical system.

Figure 6:
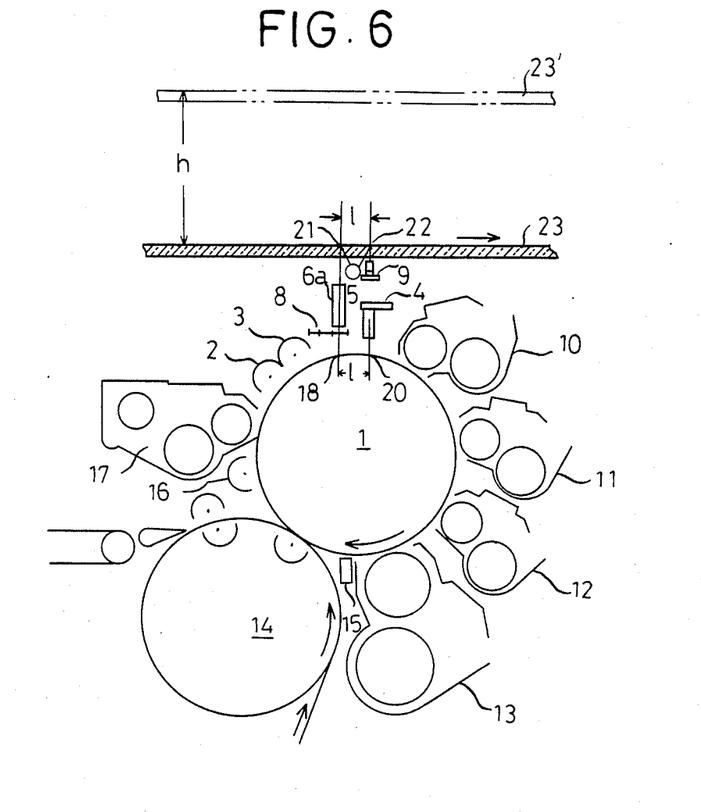
FIG. 6 is a sectional view showing the configuration of another embodiment according to the invention.

Next, a further embodiment according to the invention shown in FIG. 6 is described as follows:

In this embodiment, the exposure optical system employs a gradient-index rod lens (GIRL) array 6a which receives directly the light beams which come from a light source 5 and are reflected from an original document. The outgoing light beams from GIRL array 6a form an image on a photosensitive drum 1 to form an image exposure slit. Since the imaging range of individual GIRLs is extremely narrow, the cosine law permits the light path length to be extremely short, thus realizing very short distances between the surface of the original and the incident surface of GIRL array 6a as well as between the outgoing surface and the exposure point 18 on the photosensitive drum 1. Therefore, a color separation filter 8 is not a rotational changeover type like the ones in aforesaid embodiments, but is of the type which moves right and left for changeover. The image formed by GIRL array 6a is a mirror image to the original, which is scanned by moving it at the same speed and in the same direction as those of the motion of the photosensitive drum 1 at the exposure point 18.

In this embodiment, a color image sensor 9 including an image-forming lens is disposed to receive light from light source 5 reflected from the original document at a point 22, which is a distance l from a document point 21 irradiated by the light source 5 for image exposure. Point 21 is behind point 22 when viewed from the scanning direction of said document (ahead viewed from the moving direction of the document for scanning). An eraser 4 is so arranged that its illumination point 20 falls onto a point 20, which is the same distance l from an image exposure slit center 18 on the photosensitive drum 1. Point 18 is behind point 20 when viewed from the scanning direction (ahead viewed from the moving direction of the drum 1). No memory or delay circuit exists between the output processing circuit in the color image sensor 9 and the eraser 4. In other respects, the configuration is the same as in the apparatus shown in FIG. 1.

As mentioned above for the apparatus of FIG. 6, since the exposure optical system does not use a common, single image-forming lens and a plurality of mirrors, but of the GIRL array 6a, this not only shortens the light path length and eliminates the need for mirrors, but also considerably reduces the distance between a contact glass 23 and the photosensitive drum 1, which results in a compact-size apparatus. The position of the contact glass 23 in the case of the common exposure optical system shown in FIG. 1 is shown by the two-dot chain lines in FIG. 6. In other words, in the embodiment of FIG. 6, the height of the copying apparatus can be lowered by the length h as compared to FIG. 1.

Furthermore, since both the original document and the vicinity of the exposure portion on the photosensitive drum 1 move at the same speed and in the same direction, the time for the exposure center 21 on the document to move the distance l to reach the reading point 22 by the color image sensor 9 is equal to the time required for the exposure slit center 18 on the photosensitive drum 1 to reach the erasing point 20. Therefore, a desirable image processing does not need memory nor delay circuit, because point 20 on the drum 1 was exposed to the image on the document which is at the point 22.

In addition, if the image reading point 22 by the color image sensor 9 is disposed behind (in view of the scanning direction) the document illumination center 21 for exposure, the illumination point 20 of the eraser 4 should be behind the exposure point 18.

Figure 7:
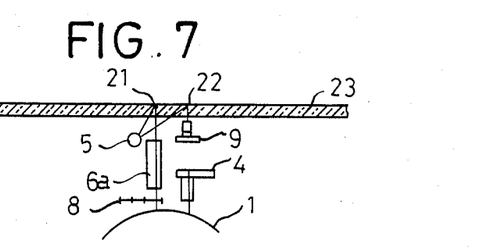
FIG. 7 is a sectional view showing vital parts of a modified embodiment of the invention illustrated in FIG. 6.

The position of the light source 5 is not limited to between the document illumination point 21 for exposure and the reading point 22 by the color image sensor 9 as shown in FIG. 6, but may be outside of the points 21 and 22, as shown in FIG. 7. The arrangement in FIG. 6, however, provides both points 21 and 22 with smaller incident angles, resulting in less loss of light.

As mentioned above, the invention does not require any additional document illumination lamp for the color image sensor, as it uses the light source for illuminating the original document. Also, no memory and delay circuits are needed and, hence, there are advantages of cost reduction.

What is claimed is:

1. A multicolored image forming apparatus comprising:

a light source illuminating an original document to produce a first light beam reflected from an illumination slit position on the document and a second light beam reflected from an image sensor position on the document which is spaced along the document from the illumination slit position by a first selected distance;

a photosensitive member and an exposure optical system forming an image of the first light beam at an exposure slit position on said photosensitive member and forming an image of said second light beam at an eraser illumination position on said photosensitive member, wherein the exposure slit position and the eraser illumination position are spaced from each other along the photosensitive member by a second selected distance which corresponds to the first selected distance and wherein each of the exposure slit position and the eraser illumination position extends along the width of said photosensitive member;

an image sensor extending in the direction of the width of said photosensitive member and receiving at least a portion of said second light beam and providing, in response, a processed output; and an eraser comprising a light emitting element array extending in the direction of the width of said photosensitive member to selectively illuminate said photosensitive member at said eraser illumination position and means to selectively turn on and off said light emitting elements to selectively erase, in response to said processed output, the image formed on said photosensitive member by said second beam; and wherein image processing is achieved by illuminating the document by said light source, forming an image on said photosensitive member through said exposure optical system to effect slit exposure while reading the document image by said image sensor, and turning on and off said light emitting elements in said eraser selectively in response to said processed output of said image sensor to erase said photosensitive member;

wherein said light source simultaneously illuminates the image sensor position on the document and said illumination slit position on the document.

2. A multicolored image forming apparatus as claimed in claim 1, wherein the exposure optical system comprises a lens through which said first and second light beams pass and which has a selected angle of view, and said image sensor is disposed relative to the angle of view of said lens to permit said first and second light beams to simultaneously form respective images on said photosensitive member and to allow a portion of said second light beam to impinge on said image sensor.

3. A multicolored image forming apparatus as claimed in claim 1, wherein said second light beam reflected from the original reaches said image sensor without passing through said exposure optical system.

4. A multicolored image forming apparatus as claimed in claim 1, wherein said light source is located between said image sensor position and said illumination slit position on the document.

5. A multicolored image forming apparatus comprising:

a photosensitive member;

a slit exposure system scanning an original document in an original scanning direction to form an image of a slit-shaped imaged portion of the document on a slit-shaped image portion of said photosensitive member;

wherein the imaged portion of the document moves relative to the document in an original scanning direction, and the image portion of said photosensitive member moves relative to the member in an image scanning direction;

an image sensor which views a slit-shaped viewed portion of the document which moves relative to the document in said original scanning direction, said sensor producing a processed output signal in response to said viewed portion;

an eraser responsive to said processed output signal from the image sensor to selectively erase a slit-shaped erasure portion of the photosensitive member which moves relative to the member in said image scanning direction;

wherein the imaged and the viewed portions of the document are spaced from each other along the document, and the image and erasure portions of the photosensitive member are spaced from each other along the member such that at the time a given portion of the document is viewed by said image sensor, an image of said given portion is at said erasure position on said photosensitive member;

whereby the image of the portion of the document which at a given time is being viewed by said image sensor can be selectively erased from the photosensitive member at the same time by said eraser.

6. A multicolored image forming apparatus as in claim 5 in which the viewed portion of the document is behind the imaged portion of the document with respect to the document scanning direction and the erasure portion of the photosensitive member is behind the image portion of the photosensitive member with respect to said image scanning direction.

7. A multicolored image forming apparatus as in claim 6 in which the spacing along the document between the viewed and imaged portions thereof is the same as the spacing along the photosensitive member between the erasure and image portions thereof.

8. A multicolored image forming apparatus as in claim 7 in which the exposure system comprises a lens through which the image sensor views said viewed portion of the document and said image of the imaged portion of the document is transmitted to the photosensitive member.

9. A multicolored image forming apparatus as in claim 8 including a half-reflective mirror through which the image sensor views said viewed portion of the document.

10. A multicolored image forming apparatus as in claim 8 including a half-reflective mirror which reflects an image of said viewed portion of the document to said image sensor.

11. A multicolored image forming apparatus as in claim 8 in which the image sensor views the document directly rather than through a part of said exposure system, and wherein said exposure system includes a light source which illuminates both the viewed and the imaged portions thereof.

12. A multicolored image forming apparatus as in claim 11 in which the light source is located on one side of said viewed and imaged portions of the document.

13. A multicolored image forming apparatus as in claim 11 in which the light source is located between said viewed and imaged portions of the document.

14. A multicolored image forming apparatus as in claim 5 in which the exposure system comprises a GIRL array.

15. A multicolored image forming apparatus as in claim 5 in which one upright plane passes through both the imaged portion of the document and the image section of the photosensitive member, and another upright plane passes through both the viewed portion of the document and the erasure section of the photosensitive member.

16. A multicolored image forming apparatus as in claim 15 in which the exposure system comprises a GIRL array.

17. A multicolored image forming apparatus as in claim 16 in which the exposure system comprises a light source located on one side of said GIRL array and image sensor.

18. A multicolored image forming apparatus as in claim 16 in which the exposure system comprises a light source located between said GIRL array and image sensor.

19. A multicolored image forming apparatus as in claim 5 in which the exposure system comprises a lens through which the image sensor views said viewed portion of the document and said image of the imaged portion of the document is transmitted to the photosensitive member.

20. A multicolored image forming apparatus as in claim 5 including a half-reflective mirror through which the image sensor views said viewed portion of the document.

21. A multicolored image forming apparatus as in claim 5 including a half-reflective mirror which reflects an image of said viewed portion of the document to said image sensor.

22. A multicolored image forming apparatus as in claim 5 in which the image sensor views the document directly rather than through a part of said exposure system, and wherein said exposure system includes a light source which illuminates both the viewed and the imaged portions thereof.

23. A multicolored image forming apparatus as in claim 22 in which the light source is located on one side of said viewed and imaged portions of the document.

24. A multicolored image forming apparatus as in claim 22 in which the light source is located between said viewed and imaged portions of the document.

* * * * *